(12) United States Patent
Boettcher

(10) Patent No.: US 12,734,743 B2
(45) Date of Patent: Sep. 15, 2026

(54) APPARATUS, CONTROL SYSTEM, AND METHOD FOR CONTROLLING THE LIGHT TRANSMISSION OF CONTAINERS

(71) Applicant: Krones AG, Neutraubling (DE)

(72) Inventor: Benedikt Boettcher, Bruckmühl (DE)

(73) Assignee: Krones AG, Neutraubling (DE)

( * ) Notice: Subject to any disclaimer, the term of this patent is extended or adjusted under 35 U.S.C. 154(b) by 82 days.

(21) Appl. No.: 18/777,832

(22) Filed: Jul. 19, 2024

(65) Prior Publication Data

US 2025/0026064 A1 Jan. 23, 2025

(30) Foreign Application Priority Data

Jul. 21, 2023 (DE) ......................... 102023119327.9

(51) Int. Cl.
*B29C 49/42* (2006.01)
*B29C 49/64* (2006.01)
(Continued)

(52) U.S. Cl.
CPC ........ *B29C 49/424* (2022.05); *B29C 49/6418* (2013.01); *B29C 49/78* (2013.01); *B29C 49/786* (2013.01); *B29C 2049/7861* (2022.05); *B29C 2049/78675* (2022.05); *B29K 2067/003* (2013.01); *B29K 2995/0026* (2013.01); *B29L 2031/712* (2013.01)

(58) Field of Classification Search
None
See application file for complete search history.

(56) References Cited

U.S. PATENT DOCUMENTS 10,406,741 B2 * 9/2019 Gendre ................. B29C 49/783
11,559,934 B2 1/2023 Uluturk et al.
(Continued)

FOREIGN PATENT DOCUMENTS

DE 10116665 A1 * 10/2002 ......... B29C 49/1229
DE 10165127 B3 * 5/2017 ......... B29C 49/1229
JP H08 267559 A 10/1996

OTHER PUBLICATIONS

Extended European Search Report for the European Application No. 24170767.8, mailed on Sep. 16, 2024, 5 pages.

*Primary Examiner* — Yung-Sheng M Tsui
(74) *Attorney, Agent, or Firm* — Lowenstein Sandler LLP

(57) ABSTRACT

A control circuit for an apparatus. The apparatus includes a heating device for preforms, a blow molding machine for producing containers from heated preforms, a first measuring device for determining an actual temperature of the heated preforms and a second measuring device for determining an actual light transmission of the containers. The control system is configured for controlling the light transmission of containers. The control system includes a first-level control circuit including a first comparator configured to determine a first control difference and a first controller configured to output a first adaptation of a process parameter of a station of the blow molding machine. The control system includes a subordinate control circuit including a second comparator configured to determine a second control difference and a second controller configured to output a second adaptation of a heating behavior of the heating device.

12 Claims, 1 Drawing Sheet

(51) Int. Cl.

| | |
|---|---|
| ***B29C 49/78*** | (2006.01) |
| *B29K 67/00* | (2006.01) |
| *B29L 31/00* | (2006.01) |

(56) References Cited

U.S. PATENT DOCUMENTS

| | | | | |
|---|---|---|---|---|
| 2011/0294086 | A1 | 12/2011 | Voth et al. | |
| 2020/0376736 | A1 | 12/2020 | Cowden et al. | |
| 2021/0170665 | A1* | 6/2021 | Blochmann | B29C 49/64 |
| 2021/0187815 | A1* | 6/2021 | Zimmering | B29C 49/6454 |
| 2022/0024109 | A1* | 1/2022 | Kuwano | B29C 49/6445 |
| 2023/0114201 | A1* | 4/2023 | Bhat | B29C 49/78 703/6 |
| 2024/0083095 | A1* | 3/2024 | Stopfer | G01B 11/16 |
| 2025/0065556 | A1* | 2/2025 | Protais | B29C 49/786 |

* cited by examiner

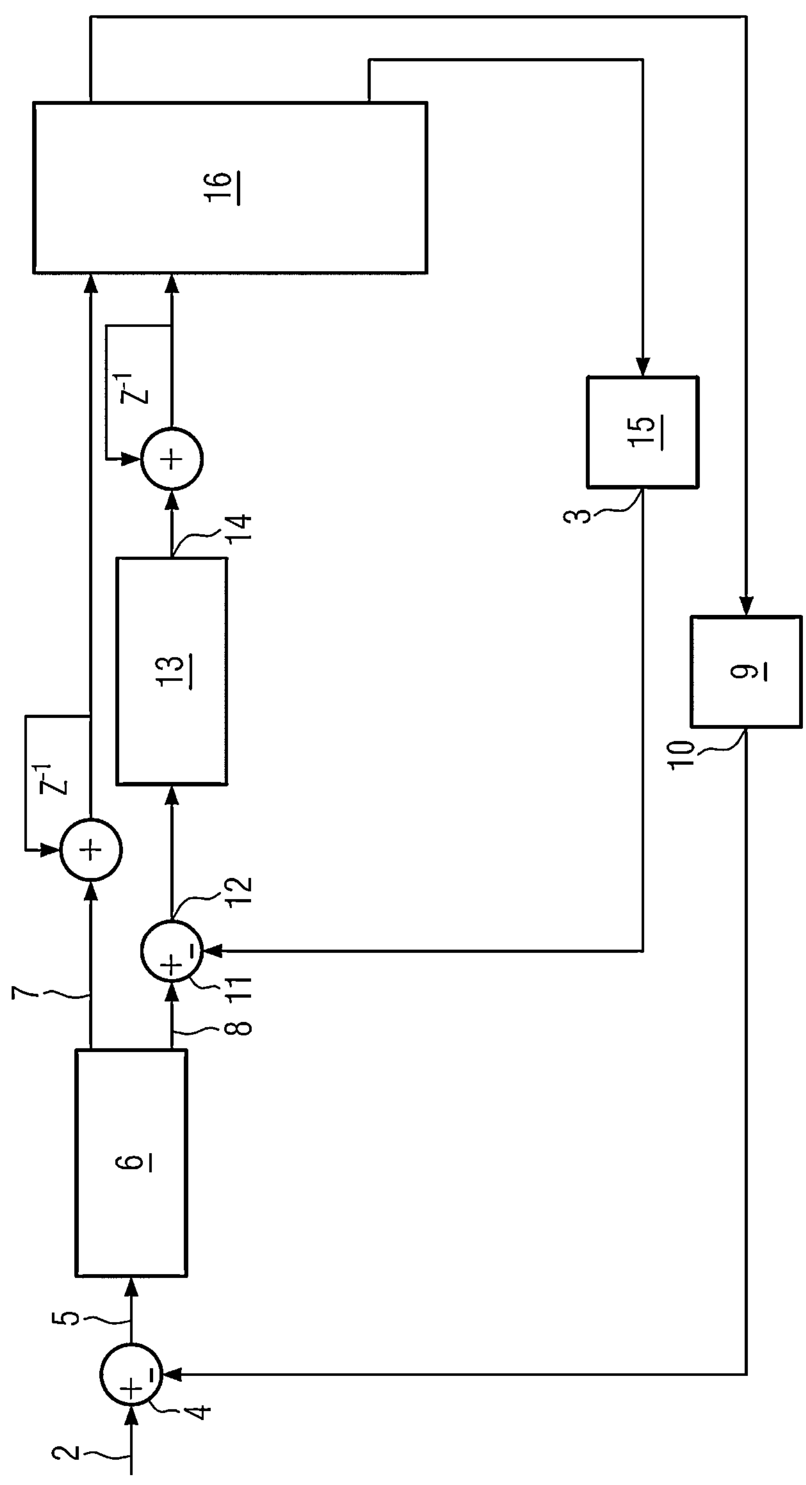
1
2
4
5
6
7
8
11
12
13
14
Z-1
Z-1
16
15
3
9
10

APPARATUS, CONTROL SYSTEM, AND METHOD FOR CONTROLLING THE LIGHT TRANSMISSION OF CONTAINERS

RELATED APPLICATIONS

This application claims the benefit under 35 U.S.C § 119 (a) of German Application No. 102023119327.9, filed Jul. 21, 2023, the entire content of which is hereby incorporated by reference.

TECHNICAL FIELD

The present disclosure relates to a control circuit for an apparatus, the apparatus comprising a heating device for preforms and a blow molding machine for producing containers from preheated preforms. The present disclosure further relates to an apparatus comprising a heating device for preforms a blow molding machine for producing containers from preheated preforms. The present disclosure additionally relates to a method for controlling the light transmission of containers.

BACKGROUND

It is known to use a control circuit for controlling light transmission values for PET containers after stretch blowing, which establishes a direct relationship between the heating parameters of a furnace for heating the preforms and the stretch blowing parameters of the stretch blowing machine as control variables and the light transmission values of the stretch blown PET containers as control variables. In general, control always takes place in a steady-state machine condition, i.e. a control intervention is carried out after the measured light transmission values have reached a steady-state behavior.

SUMMARY

Embodiments of the present disclosure provide a control circuit for an apparatus, the apparatus comprising a heating device for preforms and a blow molding machine for producing containers from preheated preforms. Embodiments of the present disclosure further provide an apparatus comprising a heating device for preforms and a blow molding machine for producing containers from preheated preforms. Embodiments of the present disclosure additionally provide a method for controlling the light transmission of containers, which can enable a temperature of the preforms on leaving the furnace and a transient behavior of the light transmission values to be taken into account.

BRIEF DESCRIPTION OF FIGURES

The accompanying figure shows, by way of example, aspects and/or embodiments of the present disclosure for better understanding and illustration.

FIG. 1 shows a control circuit for controlling the light transmission of containers, for example PET containers.

DETAILED DESCRIPTION

Embodiments include a control circuit for an apparatus that solves one or more problems of conventional systems. Embodiments comprise a heating device for preforms and a blow molding machine for producing containers from preheated preforms. In embodiments, the apparatus comprises a heating device for preforms and a blow molding machine for producing containers from preheated preforms. In some embodiments, a method for controlling the light transmission of containers is provided.

The control circuit according to embodiments of the present disclosure for an apparatus which comprises a heating device for preforms, for example PET preforms, a blow molding machine for producing containers, for example PET containers, from preheated preforms, a first measuring device for determining an actual temperature of the heated preforms and a second measuring device for determining an actual light transmission of the containers, comprises, for controlling the light transmission of containers a higher-level control circuit, having a first comparator, which is configured to determine a first control difference from a target light transmission and an actual light transmission, a first controller which is configured to output a first adaptation of a process parameter of a station of the blow molding machine, such as a pre-blowing time of the station of the blow molding machine, as a first output variable, based on the first control difference as a first input variable for a system, and to control the process parameter of the station of the blow molding machine in accordance with the first adaptation, wherein the first controller is further configured to output a target temperature of the heated preform as a second output variable based on the first control difference as an input variable, a subordinate control circuit, having a second comparator, which is configured to determine a second control difference from the set temperature of the heated preform and the actual temperature of the heated preform, a second controller which is configured to output a second adaptation of a heating behavior of the heating device as a third output variable, based on the second control difference as a second input variable for the system, and to control the heating behavior of the furnace in accordance with the second adaptation.

The system can be a system for producing the containers from preforms, for example PET preforms, which can comprise a heating device for the preforms and a blow molding machine (or stretch blowing machine) for producing containers from preheated preforms.

The control circuit can enable control even before the actual light transmission reaches a steady-state behavior. A transient behavior of the actual light transmission and the actual temperature (or, for example, of an actual temperature gradient (if the actual temperature comprises a plurality of actual light transmission values that may have been determined at the different points of the container, it being possible for example for the different points to be arranged along a longitudinal axis of the container)) shortly after a control intervention or in a start-up phase can be included in the control.

For example, a change to the heating device may require the subordinate control circuit to be replaced or adapted. The higher-level control circuit can be maintained by the generally applicable concept of controlling the light transmission of the containers.

The target light transmission may comprise a plurality of target light transmission values for different points of the container, and the actual light transmission may comprise a plurality of actual light transmission values that may have been determined at the different points of the container. For example, the different points can be arranged along a longitudinal axis of the container. Determining the first control difference by the first comparator can include the first control difference comprising a plurality of control difference values, which can be determined from the plurality of target light transmission values and the plurality of actual light transmission values.

The target temperature may comprise a plurality of target temperature values for different points of the preform, and the actual temperature may comprise a plurality of actual temperature values that may have been determined at the different points of the preform. For example, the different points can be arranged on a surface of the preform at different heights perpendicularly to a longitudinal axis of the container, or the different points can be arranged along a periphery of the container. Determining the second control difference using the second comparator can therefore include the second control difference comprising a plurality of control difference values, which can be determined accordingly from the plurality of target temperatures and the plurality of actual temperatures.

The process parameter can be a pre-blowing time of the station of the blow molding machine, an intermediate blowing time, a main blowing time of the station of the blow molding machine, a stretching time of a stretching process of a stretching rod of the blow molding or stretch blowing machine, a pre-blowing pressure, an intermediate blowing pressure, a main blowing pressure and/or a stretching speed The first controller may include an experimental model for the steady-state apparatus. In general, containers, for example PET containers, can leave the blow molding machine every 1/100 of a second. The first controller can therefore work so quickly that direct training of the artificial intelligence is possible. It is not necessary to provide a physical model in the first controller. Parameters of the experimental model can be determined as part of an experimental design, for example as part of a statistical design of experiment (DoE).

The experimental model can be configured to simulate light transmissions at different heights of a container, depending on the process parameter and a temperature gradient of the temperature of the heated preform and/or the respective behavior of the stations. Each station can have a different behavior. For example, the valves can switch differently at the respective stations (e.g., tolerance).

The experimental model can also be configured to simulate the light transmission for each station of the blow molding machine individually after a heating process.

The second controller can comprise a system model that can be configured to simulate temporal dynamics of a heating process following the second adaptation. Due to the sluggish system behavior of a heating process compared to a required sampling rate of the second controller, said controller should also be able to handle transient states of the heating process. A preform, such as a PET preform, can pass through a heating device in 30 seconds, for example. A reaction time of the heating device to the second adaptation can be 2 minutes, for example.

The system model is based on at least one of the following: a type of the heating device, a geometric design of a heating chamber of the heating device, a geometry of the preform, material properties of the components located in the heating chamber, for example absorptance, reflectance and/or emissivity, thermal conductivity and/or density, moisture of a plastics material, parameters that are measurable online, for example parameters that can be measured online using an IR absorptance sensor, values of temporally varying and/or constant heating parameters, initial temperature gradient of the preform at an inlet of the heating device, free and/or forced convection in the heating chamber.

The system model can be configured to calculate the resulting heat flows on the surfaces of the preforms, and the convection, at any simulation time. These can, for example, be used as boundary conditions in a numerically explicit solution of a heat conduction equation for a preform.

The system model can be configured to divide a preform wall volume into a plurality of volume elements. For example, homogeneity of material properties and temperature can apply for the volume elements. A discretization of the preform wall volume into volume elements can enable an efficient calculation of the resulting temperatures from the volume elements by a numerically explicit solution of the heat conduction equation in matrix notation.

The system model can be configured to be used during operation of the second controller and to simulate online a temperature gradient inside the wall of the preform at different heights.

The subordinate control circuit can be configured to take into account temperatures inside the wall together with the actual temperature of the heated preforms as the actual value. Since the actual temperature on the container surface can be determined, heating of the preform can be taken into account together with the temperatures inside the wall. This can be relevant for the resulting actual light transmission of a container. It can be advantageous to include this influence in the control.

A reinforcement learning agent, a model-based control, MPC control, or an algorithm that calculates an optimal control intervention by an optimization executed online over multiple scans and supported by a reinforcement learning agent can be provided for the higher-level control circuit and/or the subordinate control circuit, it being possible for the scans to relate to the light transmission of the containers or the temperature of the heated preforms.

The control circuit can be configured to assign the actual light transmissions of the containers, determined by the second measuring device, to the respective stations. This allows for individual control of the individual stations.

Furthermore, an apparatus is provided comprising a heating device for preforms, for example PET preforms, a blow molding machine for producing containers, for example PET containers, from preheated preforms, a first measuring device for determining an actual temperature of the preheated preforms, and a second measuring device for determining an actual light transmission of the containers, and a control circuit as described above or further below.

The heating device can comprise an infrared furnace or a microwave furnace or a laser furnace.

The infrared furnace can comprise heating plates in multiple lamp zones, it being possible for the heating plates to be configured to be controllable by the control circuit. For example, the heating plates can be configured to be individually controllable by the control circuit.

In the case of a microwave furnace, positions of sliding elements and/or a generator output can be configured to be controllable by the control circuit. For example, the sliding elements and/or a generator output can be configured to be individually controllable by the control circuit.

The first measuring device can be arranged at an outlet of the heating device and comprise a pyrometer and/or a thermal imaging camera, which can be configured to measure actual temperature values of the heated preform on its surface at different heights and/or peripheral directions.

The second measuring device can be configured to measure actual light transmission values of the containers at different heights and/or peripheral directions.

Furthermore, a method for controlling the light transmission of containers, for example PET containers, using an apparatus as described above or further below, is provided, the method comprising determining an actual temperature of a heated preform, for example PET preform, by the first measuring device, determining an actual light transmission of a container produced from the heated preform, by the second measuring device, determining a first control difference from a target light transmission and the actual light transmission, by the first comparator, outputting a first adaptation of a process parameter of a station of the blow molding machine, such as a pre-blowing time of the station of the blow molding machine, as a first output variable, by the first controller, based on the first control difference as a first input variable, and controlling the process parameter of the station of the blow molding machine according to the first adaptation and outputting a target temperature of the heated preform as a second output variable, based on the first control difference as an input variable, determining a second control difference from the target temperature of the heated preform and the actual temperature of the heated preform by the second comparator, outputting a second adaptation of a heating behavior of the heating device as a third output variable, by the second controller, based on the second control difference as a second input variable, and controlling the heating behavior of the furnace according to the second adaptation.

Referring now to the figures, FIG. 1 shows a control circuit 1 for controlling the light transmission of containers, for example PET containers. A system 16 for producing the containers from preforms, for example PET preforms, comprises a heating device for the preforms and a blow molding machine (or stretch blowing machine) for producing containers from preheated preforms.

The control circuit 1 comprises a higher-level control circuit (e.g., a first-level control circuit) having a first comparator 4, which is configured to determine a first control difference 5 from a target light transmission 2 and an actual light transmission 3. The actual light transmission of the containers is determined by a second measuring device 9. The target light transmission 2 may comprise a plurality of target light transmission values for different points of the container, and the actual light transmission 3 may comprise a plurality of actual light transmission values that may have been determined at the different points of the container. For example, the different points can be arranged along a longitudinal axis of the container.

A first controller 6 of the higher-level control circuit is configured to output a first adaptation 7 of a process parameter of a station of the blow molding machine as a first output variable, based on the first control difference 5 as a first input variable. The process parameter can be a pre-blowing time of the station of the blow molding machine, an intermediate blowing time, a main blowing time of the station of the blow molding machine, a stretching time of a stretching process of a stretching rod of the blow molding or stretch blowing machine, a pre-blowing pressure, an intermediate blowing pressure, a main blowing pressure, and/or a stretching speed. Multiple process parameters of a station of the blow molding machine can also be controlled by the first controller 6, e.g. multiple the above-mentioned process parameters. The first controller 6 is further configured to control the process parameter of the station of the blow molding machine according to the first adaptation 7.

In addition, the first controller 6 is further configured to output a target temperature 8 of the heated preform as a second output variable, based on the first control difference 5 as an input variable. The target temperature 8 can comprise a plurality of target temperature values for different points of the preform.

The control circuit 1 also comprises a subordinate control circuit (e.g., subordinate to the higher-level control circuit) having a second comparator 11, which is configured to determine a second control difference 12 from the target temperature 8 of the heated preform and the actual temperature 10 of the heated preform. The actual temperature of the heated preforms is determined using the first measuring device 15. The actual temperature 10 can comprise a plurality of actual temperature values, which may have been determined at the different points of the preform mentioned with regard to the target temperature. For example, the different points can be arranged on a surface of the preform at different heights perpendicularly to a longitudinal axis of the container. The actual temperature (also at different points of the preform) can be determined using a pyrometer and/or a thermal imaging camera, for example.

Furthermore, the subordinate control circuit comprises a second controller 13, which is configured to output a second adaptation 14 of a heating behavior of the heating device as a third output variable, based on the second control difference 12 as a second input variable, and to control the heating behavior of the furnace in accordance with the second adaptation 14.

What is claimed is:

1. A control circuit for an apparatus, the apparatus comprising:

a heating device for producing heated preforms;

a blow molding machine for producing containers from preheated preforms;

a first measuring device for determining an actual temperature of the heated preforms; and a second measuring device for determining an actual light transmission of the containers, wherein the control circuit is configured for controlling light transmission of the containers, the control circuit comprising:

a first-level control circuit, comprising:

a first comparator configured to determine a first control difference from a target light transmission and the actual light transmission;

a first controller configured to output a first adaptation of a process parameter of a station of the blow molding machine as a first output variable, based on the first control difference as a first input variable for a system, and further configured to control the process parameter of the station of the blow molding machine in accordance with the first adaptation, wherein the first controller is further configured to output a target temperature of the heated preform as a second output variable based on the first control difference as an input variable;

a subordinate control circuit, comprising:

a second comparator configured to determine a second control difference from the target temperature of the heated preforms and the actual temperature of the heated preforms; and a second controller configured to output a second adaptation of a heating behavior of the heating device as a third output variable, based on the second control difference as a second input variable for the system, and further configured to control the heating behavior of a furnace in accordance with the second adaptation.

2. The control circuit according to claim 1, wherein the target light transmission comprises a plurality of target light transmission values for different locations of the container, wherein the actual light transmission comprises a plurality of actual light transmission values determined at the different locations of the container, and wherein the different locations are arranged along a longitudinal axis of the container.

3. The control circuit according to claim 1, wherein the target temperature comprises a plurality of target temperature values for different locations of the preform, wherein the actual temperature comprises a plurality of actual temperature values determined at the different locations of the preform, and wherein the different locations on a surface of the preform are arranged at different heights perpendicular to a longitudinal axis of the container.

4. The control circuit according to claim 1, wherein the first controller comprises an experimental model for a steady-state device, wherein the experimental model is configured to simulate light transmissions at different heights of a container depending on the process parameter and a temperature gradient of the temperature of a heated preform and/or of the respective behavior of the stations.

5. The control circuit according to claim 1, wherein the second controller comprises a system model configured to simulate a temporal dynamic of a heating process following the second adaptation.

6. The control circuit according to claim 5, wherein the system model is based on at least one of the following:

a type of the heating device;

a geometric design of a heating chamber of the heating device;

a geometry of a preform;

material properties of components located in the heating chamber;

parameters that are measurable online;

values of temporally varying or constant heating parameters;

initial temperature gradient of the preform at an inlet of the heating device; or free or forced convection in the heating chamber.

7. The control according to claim 5, wherein the system model is configured to calculate, at each simulation time, resulting heat flows on surfaces of the preforms and convection, wherein the resulting heat flows are included in a numerically explicit solution of a heat conduction equation for a preform.

8. The control circuit according to claim 5, wherein the system model is configured to divide a preform wall volume into a plurality of volume elements, wherein homogeneity of material properties and temperature applies for the volume elements, wherein the system model is configured to be used during operation of the second controller and to simulate online a temperature gradient inside the wall of the preform at different heights.

9. The control circuit according to claim 1, wherein a reinforcement learning agent, a model-based control, MPC control, or an algorithm that calculates an optimal control intervention by an optimization executed online over multiple scans and/or supported by a reinforcement learning agent is provided for at least one of the first-level control circuit and/or the subordinate control circuit, wherein the scans relate to the light transmission of the containers or the temperature of the heated preforms.

10. The control circuit according to claim 1, wherein the control circuit is further configured to assign the actual light transmissions of the containers determined by the second measuring device to the respective stations.

11. The control circuit according to claim 4, wherein the experimental model is further configured to individually simulate the light transmissions for each station of the blow molding machine following a heating process.

12. The control circuit according to claim 8, wherein the subordinate control circuit is configured to take into account temperatures inside the wall together with the actual temperature of the heated preforms as an actual value.

* * * * *